United States Patent
Koskinen et al.

(10) Patent No.: US 10,524,153 B2
(45) Date of Patent: Dec. 31, 2019

(54) REPORTING OF RRC MISMATCH OCCURRENCES

(71) Applicant: Nokia Technologies Oy, Espoo (FI)

(72) Inventors: Jussi-Pekka Koskinen, Oulu (FI); Tero Henttonen, Espoo (FI); Malgorzata Tomala, Wroclaw (PL)

(73) Assignee: Nokia Technologies Oy, Espoo (FI)

( * ) Notice: Subject to any disclaimer, the term of this patent is extended or adjusted under 35 U.S.C. 154(b) by 71 days.

(21) Appl. No.: 15/880,881

(22) Filed: Jan. 26, 2018

(65) Prior Publication Data

US 2018/0220320 A1 Aug. 2, 2018

Related U.S. Application Data

(60) Provisional application No. 62/451,169, filed on Jan. 27, 2017.

(51) Int. Cl.
*H04W 24/10* (2009.01)
*H04W 76/27* (2018.01)
*H04W 64/00* (2009.01)

(52) U.S. Cl.
CPC .......... *H04W 24/10* (2013.01); *H04W 76/27* (2018.02); *H04W 64/00* (2013.01)

(58) Field of Classification Search
None
See application file for complete search history.

(56) References Cited

U.S. PATENT DOCUMENTS

| | | | |
|---|---|---|---|
| 8,885,517 B2* | 11/2014 | Deivasigamani | H04W 76/27 370/254 |
| 2013/0190031 A1* | 7/2013 | Persson | H04W 24/08 455/517 |
| 2013/0215834 A1 | 8/2013 | Deivasigamani et al. | 370/329 |
| 2014/0269637 A1* | 9/2014 | Banister | H04L 5/0078 370/336 |
| 2014/0334389 A1 | 11/2014 | Abdel-Samad et al. | 370/329 |
| 2018/0220319 A1* | 8/2018 | Kim | H04W 24/10 |

OTHER PUBLICATIONS

"Report of email discussion [95bis#12][LTE/TEI14] State mismatch", NTT DOCOMO, Inc., 3GPP TSG-RAN WG2 #96, R2-168060, Nov. 2016, 9 pgs.

"Discussion on solution for RRC state mismatch", NTT DOCOMO, Inc., 3Gpp TSG-RAN WG2 #96, R2-168062, Nov. 2016, 4 pgs.

"Introduction of RRC connection re-establishment time", NTT DOCOMO, Inc., 3GPP TSG-RAN WG2 Meeting #96, R2-168066, Nov. 2016, 12 pgs.

(Continued)

*Primary Examiner* — Lonnie V Sweet
(74) *Attorney, Agent, or Firm* — Harrington & Smith (57) ABSTRACT

A method is provided including determining, at a user equipment, whether a control state mismatch occurred between the user equipment and a wireless network, the control state mismatch corresponding to an occasion where the user equipment is operating in a different control state than is expected by the wireless network; generating, at the user equipment, a report comprising information related to at least one occurrence of a control state mismatch; and transmitting, from the user equipment, the report to the wireless network.

21 Claims, 6 Drawing Sheets

(56) References Cited

OTHER PUBLICATIONS

"Introduction of RRC connection re-establishment timer", NTT DOCOMO, Inc., 3GPP TSG-RAN WG2 Meeting #96, R2-168069, Nov. 2016, 2 pgs.
R2-166691, 3GPP TSG RAN WG2 Meeting #95bis, "UE RRC state mismatch between UE and network", Intel Corporation, Oct. 2016, 3 pgs.
R2-168060, 3GPP TS-RAN WG2 #96, "Report of email discussion [95 bis#12][LTE/TEI14] State mismatch", NTT DOCOMO, Inc., Nov. 2016, 9 pgs.
R2-167140, 3GPP TSG-RAN WG2#95bis, "Discussion on RRC state mismatch issue", NTT DOCOMO, Inc., Oct. 2016, 4 pgs.
R2-166671, 3GPP TSG-RAN WG2 #95bis, "RRC Idle Connected mode mismatch", Ericsson, Oct. 2016, 3 pgs.
R2-168062, 3GPP TSG-RAN WG2 #96, "Discussion on solution for RRC state mismatch", NTT DOCOMO, Inc., Nov. 2016, 4 pgs.

\* cited by examiner

```
-- ASN1START

UEInformationRequest-r9 ::=             SEQUENCE {
    rrc-TransactionIdentifier           RRC-TransactionIdentifier,
    criticalExtensions                  CHOICE {
        c1                                  CHOICE {
            ueInformationRequest-r9             UEInformationRequest-r9-IEs,
            ueInformationRequest-r14            UEInformationRequest-r14-IEs,
            spare3 NULL, spare2 NULL, spare1 NULL
        },
        criticalExtensionsFuture            SEQUENCE {}
    }
}

UEInformationRequest-r9-IEs ::=         SEQUENCE {
    rach-ReportReq-r9                       BOOLEAN,
    rlf-ReportReq-r9                        BOOLEAN,
    nonCriticalExtension                    UEInformationRequest-v930-IEs       OPTIONAL
}

UEInformationRequest-r14-IEs ::=        SEQUENCE {
    rrc-MismatchReportReq-r14               BOOLEAN,
    nonCriticalExtension                    SEQUENCE {}                         OPTIONAL
}

-- ASN1STOP
```

*UEInformationRequest message*

REPORTING OF RRC MISMATCH OCCURRENCES

CROSS-REFERENCE TO RELATED APPLICATIONS

The present application claims the benefit under 35 U.S.C. § 119(e) of U.S. Provisional Patent Application No. 62/451,169, filed on Jan. 27, 2017, the disclosure of which is hereby incorporated by reference in its entirety.

TECHNICAL FIELD

This invention relates generally to wireless networks and, more specifically, relates to radio resource control states in wireless networks.

BACKGROUND

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section. Abbreviations that may be found in the specification and/or the drawing figures are defined below, after the main part of the detailed description section.

Typically, existing wireless network include two broad access stratum (AS) radio resource control states: an idle state, and a connected state. The radio resource control (RRC) state of a user device determines the functional capabilities and behaviors of the user device and the radio resource configuration for the user device.

BRIEF SUMMARY

This section is intended to include examples and is not intended to be limiting.

In an example of an embodiment, a method is disclosed that includes determining, at a user equipment, whether a control state mismatch occurred between the user equipment and a wireless network, the control state mismatch corresponding to an occasion where the user equipment is operating in a different control state than is expected by the wireless network; generating, at the user equipment, a report comprising information related to at least one occurrence of a control state mismatch; and transmitting, from the user equipment, the report to the wireless network.

An example of an apparatus includes one or more processors and one or more memories including computer program code. The one or more memories and the computer program code are configured to, with the one or more processors, cause the apparatus to perform at least the following: determining, at a user equipment, whether a control state mismatch occurred between the user equipment and a wireless network, the control state mismatch corresponding to an occasion where the user equipment is operating in a different control state than is expected by the wireless network; generating, at the user equipment, a report comprising information related to at least one occurrence of a control state mismatch; and transmitting, from the user equipment, the report to the wireless network.

An example of a non-transitory computer readable memory comprising computer program code embodied thereon, which when executed by an apparatus causes the apparatus to perform at least the following determining, at a user equipment, whether a control state mismatch occurred between the user equipment and a wireless network, the control state mismatch corresponding to an occasion where the user equipment is operating in a different control state than is expected by the wireless network; generating, at the user equipment, a report comprising information related to at least one occurrence of a control state mismatch; and transmitting, from the user equipment, the report to the wireless network.

In an example of an embodiment, a method is disclosed that includes configuring one or more user equipments of a wireless network to provide information corresponding to whether one or more control state mismatches occurred between a user equipment and the wireless network, wherein the control state mismatch corresponds to an occasion where the user equipment is operating in a different control state than expected by the wireless network; and receiving at least one report comprising the information corresponding to the one or more control state mismatches.

An example of an apparatus includes one or more processors and one or more memories including computer program code. The one or more memories and the computer program code are configured to, with the one or more processors, cause the apparatus to perform at least the following: configuring one or more user equipments of a wireless network to provide information corresponding to whether one or more control state mismatches occurred between a user equipment and the wireless network, wherein the control state mismatch corresponds to an occasion where the user equipment is operating in a different control state than expected by the wireless network; and receiving at least one report comprising the information corresponding to the one or more control state mismatches.

An example of a non-transitory computer readable memory comprising computer program code embodied thereon, which when executed by an apparatus causes the apparatus to perform at least the following configuring one or more user equipments of a wireless network to provide information corresponding to whether one or more control state mismatches occurred between a user equipment and the wireless network, wherein the control state mismatch corresponds to an occasion where the user equipment is operating in a different control state than expected by the wireless network; and receiving at least one report comprising the information corresponding to the one or more control state mismatches.

DETAILED DESCRIPTION

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The description below generally refers to LTE terms however this is not intended to be limiting, and the description is equally applicable to other wireless networks, such as 5G wireless networks for example. For example, the LTE term 'eNB' is equally applicable to a 5G base station (commonly referred to as a 'gNB') for the purposes of the description below. Embodiments applicable to AS radio resource control states in LTE: an idle state, and a connected state, are equally applicable to AS radio resource control states in 5G: an idle state, an inactive state, and a connected state.

The exemplary embodiments herein describe techniques for reporting of RRC mismatch occurrences. Additional description of these techniques is presented after a system into which the exemplary embodiments may be used is described.

Figure 1:
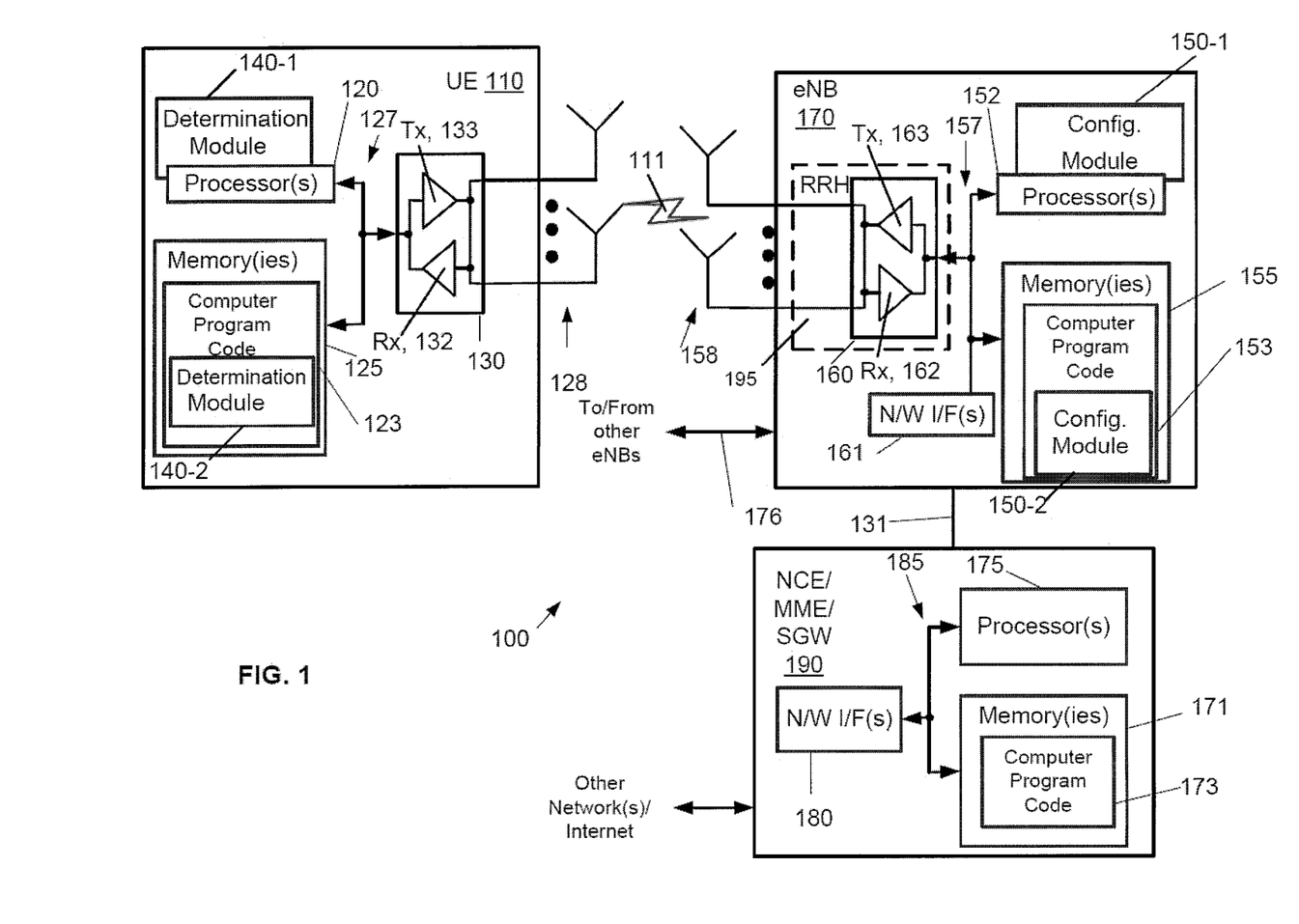
FIG. 1 is a block diagram of one possible and non-limiting exemplary system in which the exemplary embodiments may be practiced.

Turning to FIG. 1, this figure shows a block diagram of one possible and non-limiting exemplary system in which the exemplary embodiments may be practiced. In FIG. 1, a user equipment (UE) 110 is in wireless communication with a wireless network 100. A UE is a wireless, typically mobile device that can access a wireless network. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a determination module, comprising one of or both parts 140-1 and/or 140-2, which may be implemented in a number of ways. The determination module may be implemented in hardware as determination module 140-1, such as being implemented as part of the one or more processors 120. The determination module 140-1 may be implemented also as an integrated circuit or through other hardware such as a programmable gate array. In another example, the determination module may be implemented as determination module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with eNB 170 via a wireless link 111.

The eNB (evolved NodeB) 170 is a base station (e.g., for LTE, long term evolution) that provides access by wireless devices such as the UE 110 to the wireless network 100. The eNB 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The eNB 170 includes a configuration module, comprising one of or both parts 150-1 and/or 150-2, which may be implemented in a number of ways. The configuration module may be implemented in hardware as configuration module 150-1, such as being implemented as part of the one or more processors 152. The configuration module 150-1 may be implemented also as an integrated circuit or through other hardware such as a programmable gate array. In another example, the configuration module may be implemented as configuration module 150-2, which is implemented as computer program code 153 and is executed by the one or more processors 152. For instance, the one or more memories 155 and the computer program code 153 are configured to, with the one or more processors 152, cause the eNB 170 to perform one or more of the operations as described herein. The one or more network interfaces 161 communicate over a network such as via the links 176 and 131. Two or more eNBs 170 communicate using, e.g., link 176. The link 176 may be wired or wireless or both and may implement, e.g., an X2 interface.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195, with the other elements of the eNB 170 being physically in a different location from the RRH, and the one or more buses 157 could be implemented in part as fiber optic cable to connect the other elements of the eNB 170 to the RRH 195.

It is noted that description herein indicates that "cells" perform functions, but it should be clear that the eNB that forms the cell will perform the functions. The cell makes up part of an eNB. That is, there can be multiple cells per eNB. For instance, there could be three cells for a single eNB carrier frequency and associated bandwidth, each cell covering one-third of a 360 degree area so that the single eNB's coverage area covers an approximate oval or circle. Furthermore, each cell can correspond to a single carrier and an eNB may use multiple carriers. So if there are three 120 degree cells per carrier and two carriers, then the eNB has a total of 6 cells.

The wireless network 100 may include one or more network control elements (NCE) 190 that may include MME (Mobility Management Entity) and/or SGW (Serving Gateway) functionality, and which provides connectivity with a further network, such as a telephone network and/or a data communications network (e.g., the Internet). The one or more NCE 190 may be implemented as virtual elements using network virtualization as described in more detail below. The eNB 170 is coupled via a link 131 to the NCE 190. The link 131 may be implemented as, e.g., an S1 interface. The NCE 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the NCE 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, eNB 170, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Having thus introduced one suitable but non-limiting technical context for the practice of the exemplary embodiments of this invention, the exemplary embodiments will now be described with greater specificity.

In typical wireless systems, such as LTE and LTE advanced, there are two broad RRC states: Idle (RRC_IDLE) and Connected (RRC_CONNECTED). The RRC state of the user equipment (UE) determines the functional capabilities and behaviors of the UE and the radio resource configuration for the UE. In the idle state, the UE is registered in the network, but it cannot perform any user-plane communication with the network. In order for the UE to perform any data communication, the UE must move into the connected state by establishing an RRC connection. When the UE is in RRC_CONNECTED state, radio resources are configured for the UE by the network and the UE actively monitors the downlink control channels of its serving base station. A user in RRC_CONNECTED state may eventually be released into the RRC_IDLE state if there is no data communication between the UE and the network for a certain timeout period to conserve power. Both the idle and connected states may also include sub-states. For example, the idle state may include a suspended state where the UE retains RRC configuration but has to resume the connection to continue user plane transmission. Also, the connected state may include an inactive sub-state (also referred to as a "light connected" state in LTE), where a UE has no active RRC configuration but is allowed to send at least one packet to the network without obtaining an active RRC configuration that characterizes the connected state.

The RRC Connection Release procedure is designed to release the UE's RRC connection. In this way, the network sends a RRC connection release message, and when the UE receives the message the RRC state should be aligned in both the UE and the network. This message may not always be acknowledged if the UE is not able to do so during the message processing time, which avoids the UE retaining the RRC connection for an indefinite time in bad radio conditions. In certain situations, such as when the UE fails to receive the connection release message from the network, the UE may determine that it is in one RRC state and the network may determine that the UE is in a different RRC state, which may lead to certain problems.

Figure 2:
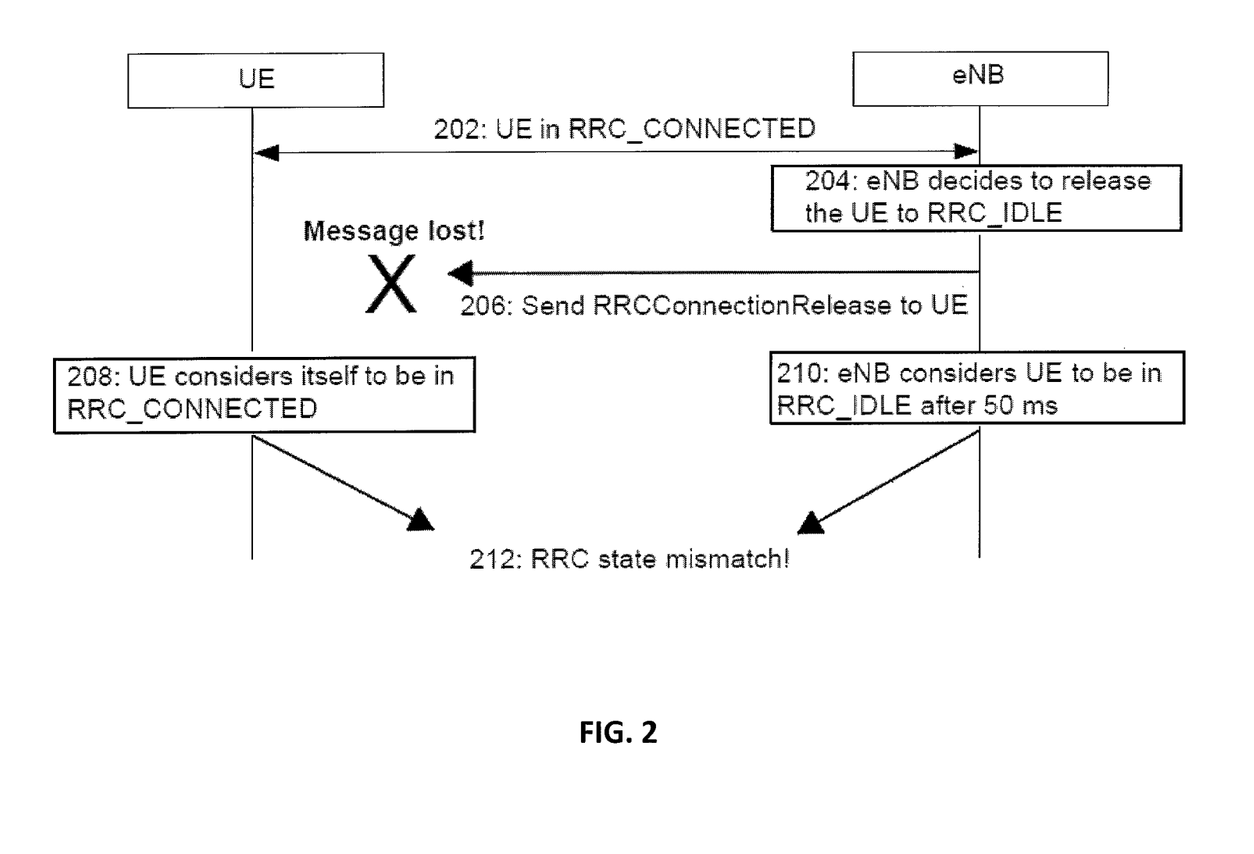
FIG. 2 is a signaling diagram showing an example of an RRC mismatch occurrence between a user equipment and a base station.

Referring now to FIG. 2, this figure shows an example of a RRC state mismatch between the UE and a network. At 202, a UE is initially in an RRC_CONNECTED state with an eNB. At 204, the eNB decides to release the UE to an RRC_IDLE state. Accordingly, the eNB transmits an RRCConnectionRelease message to the UE at 206, however, the message is not successfully received by the UE. At 208, the UE still considers itself to be in the RRC_CONNECTED state since the RRCConnectionRelease message was not successfully received. However, at 210 the eNB considers the UE to be in the RRC_IDLE state 50 ms after sending the RRCConnectionRelease message. Since the UE considers itself to be in the RRC_CONNECTED state and the eNB considers the UE to be in the RRC_IDLE state, there is a RRC state mismatch as shown at 212.

It is also possible that a "reverse mismatch" occurs. In this situation, a UE may consider itself to be in RRC_IDLE, while the network considers the UE to be in RRC_CONNECTED. This can occur when a UE autonomously moves to RRC_IDLE based on long inactivity or poor radio conditions without receiving RRC connection release message from the network, at which point the UE will consider itself to be in RRC_IDLE but the network will consider the UE to still be in RRC_CONNECTED.

The occurrence of an RRC state mismatch between a UE and the network, such as shown in FIG. 2, may cause at least the following problems:

The UE may not respond to eNB-initiated paging since such paging is only used for UEs in RRC_IDLE; and The eNB may not accept UE scheduling requests (SRs) since the network considers the UE to be in RRC_IDLE.

One way to resolve the RRC mismatch problem is by utilizing a timer that pushes UE to idle when expired. This timer can for example be configured by the network. Questions arise such as how the timer will be configured, which values should be used for the timer, or how UEs that do not support the timer will be handled. In order to address these questions, there is a need for the network to detect, whether the problem occurs in the network and/or how frequently it occurs. Making such information available to the network could also provide an additional knowledge to the network operators about the network quality.

Some options for triggering the "mismatch" timer to be started may be based on data that is monitored from the network and/or certain UE intelligence. For instance, the mismatch timer may be configured to start if the UE detects inactivity for some predetermined period of time and/or on reception of every PDCCH. In some examples, the UE may implement machine learning techniques to apply certain behavior based on repeatable scenarios. A person of ordinary skill in the art will appreciate that the embodiments described herein may be easily adapted to for whichever implementation 3GPP eventually agrees upon.

Currently, LTE implements a Minimization of Drive Test (MDT)/Radio Link Failure (RLF) logging frameworks which were created to allow UEs log various issues experienced in the network. The MDT/RLF logging may include for example signal strengths, experienced RLFs, experienced RACH failures, etc. Such logging is used to indicate various problem cases and allow network to collect data via reports provided by UEs relating to the radio conditions when the problems occurred, and possibly react to the problems.

Exemplary embodiments described herein allow a UE to log RRC mismatch occurrences (e.g. occasions when the timer expires) and provide a report to the network. Along with RRC mismatch occurrences, UE can also provide other related data to the network, for example, statistics of the used timer values (e.g. average time until timer was stopped) as discussed in more detail below. Additionally or alternatively, metrics such as time of failure, cell, frequency or measurement results of the failure occasion may also be logged and reported by the UE. This allows the operator to detect RRC state mismatches and allows optimization of network planning, e.g., by adjusting the timer settings.

In example embodiments, a UE may determine that an RRC state mismatch has occurred, for example based on the expiry of a mismatch timer, and log each RRC state mismatch occurrence. For each of these occurrences, the UE may also optionally collect data related to the RRC mismatch occurrence. This data may include, for example, a value that the mismatch timer was set to, a time that the RRC mismatch was detected, a cell, a frequency, and/or measurement results (e.g. RSRP, RSRQ, RS-SINR) of failure occasion. The collected data may also include results from both serving and neighbor cells. This data may be reported to the network by the UE which allows, e.g., a network operator to monitor the frequency of RRC state mismatch occurrences, analyses the received statistics and apply corrective measures such as timer parameter setting or other network optimizations.

The UE could report the data related to detected mismatch occurrences as a part of some existing reporting framework, e.g., within the MDT framework the RLF reporting framework, or a security problem message transmission framework. The UE could however use any other means for reporting.

An eNB may initiate an RRC Connection Release based on lack of scheduled data, inactivity timers, congestion, load control and/or error situations. According to some embodiments, then a UE may report information corresponding to the mismatch timer regardless of whether an RRC mismatch occurs. This is helpful, for example, when the network implements repeating RRC ConnectionRelease procedures. For instance, this information may include a time value from when the UE transitioned to RRC_IDLE. If a mismatch occurs, then the UE may report a time value that is equal to the configured mismatch timer value. On the other hand, if an RRC mismatch did not occur then the UE could report some other value, e.g., to indicate how close the mismatch timer was from expiring. Based on this information, the network (e.g. an eNB) may determine whether a mismatch occurred. If an eNB repeats an RRC connection release procedure then different UEs may receive the release message later than the others, which would indicate that the repetition of the RRCConnectionRelease message was not needed. By collecting such information from the UE, the network receives assistance information to help to determine when repeating an RRC connection release procedure may be helpful and what timer values could be reasonable.

According to an exemplary embodiment, the network may explicitly or implicitly indicate to UEs via dedicated or broadcast signaling whether the UEs should log RRC mismatches occurrences and information related to the occurrences. For example, a UE may be configured to log all occurrences of RRC mismatches if the network provides a UE with a mismatch timer configuration. The UE may automatically perform the procedure of recording the associated data that is preconfigured when the timer expires and the UE is pushed to an idle mode. Alternatively, a UE may automatically collect information related to RRC mismatches according to the UE's capabilities, e.g., if the UE is capable of detecting such RRC mismatches.

In some embodiments, a UE that is configured to log and/or report information for RRC mismatch occurrences may also receive a request from the network to log occurrences of RRC mismatches within the logged MDT framework. The logged occurrences availability may be further indicated to the network. For instance, an indicator field within a message sent from UE to network during connection establishment or during E-UTRAN handover (e.g. RRCConnectionSetupComplete message) and re-establishment (e.g. RRCReestablishmentComplete message), may indicate the logged RRC mismatch information availability at the UE. A UE may also be configured to always log occurrences within at least one of: the RLF reporting framework, the MDT reporting framework, a reporting framework specific to security issues. In some examples, the UE may indicate to an eNB when setting up a connection that it has a logged information related to the RRC mismatch for reporting to the network. In some examples, a UE may report RRC mismatches in a specific log for reporting only RRC mismatches.

Figure 3:
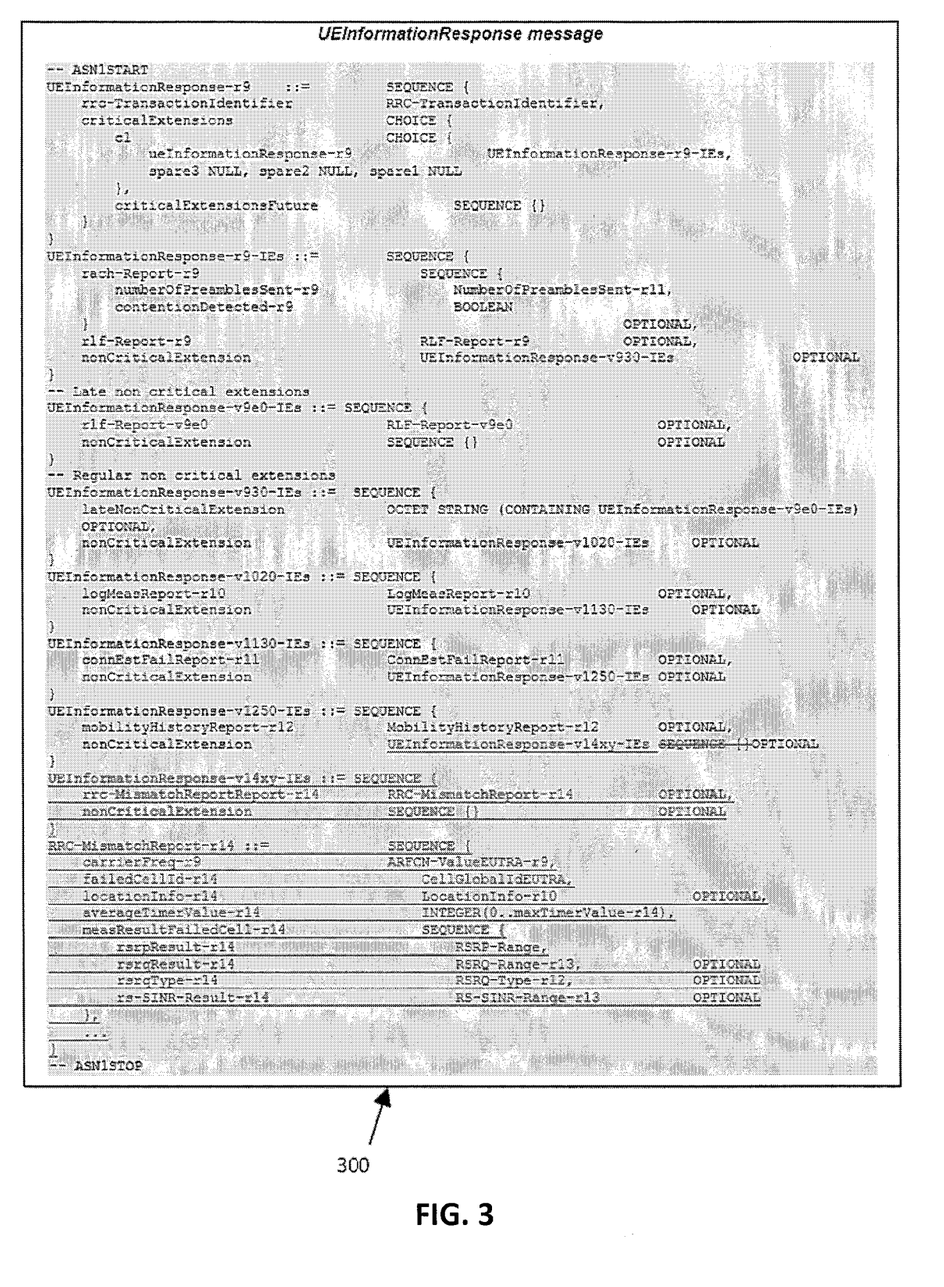
FIG. 3 shows an example structure of a reporting message for reporting information related to RRC mismatches in accordance with exemplary embodiments.

Referring now to FIG. 3, this figure shows a non-limiting example of a structure for a UEInformationResponse message 300 for reporting information related to RRC mismatches in accordance with exemplary embodiment. The UEInformationResponse message 300 is described using Abstract Syntax Notation 1 (ASN.1), and the information relating to reporting the RRC mismatches is shown in underline. In particular, the UEInformationResponse message 300 includes a non-critical extension for reporting RRC mismatch occurrences, which in this example is implemented using a LTE Rel-14 extension. As will be appreciated by a person skilled in the art, the modified UEInformationResponse message 300 includes parameters for a UE to report various information for RRC mismatch occurrences. In particular, the modified UEInformationResponse message 300 shown in FIG. 3 includes parameters for reporting the following information: frequency, failed cell, location information, average timer value, and a measurement report for the failed cell. The measurement report for the failed cell may include measurement results performed by the UE (e.g. RSRP and SINR).

Figure 4A:
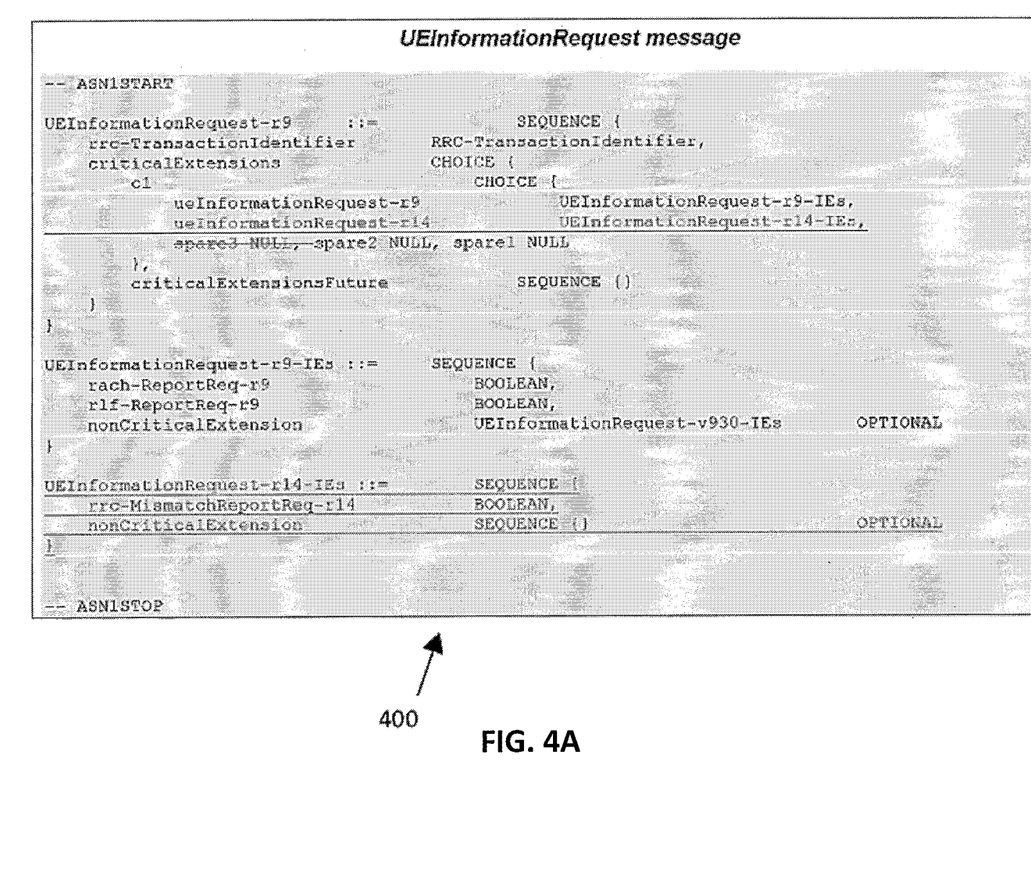
FIGS. 4A and 4B shows example structures of a request message and a response message, respectively, for RRC mismatch occurrence acquiring and reporting in accordance with exemplary embodiments.
Figure 4B:
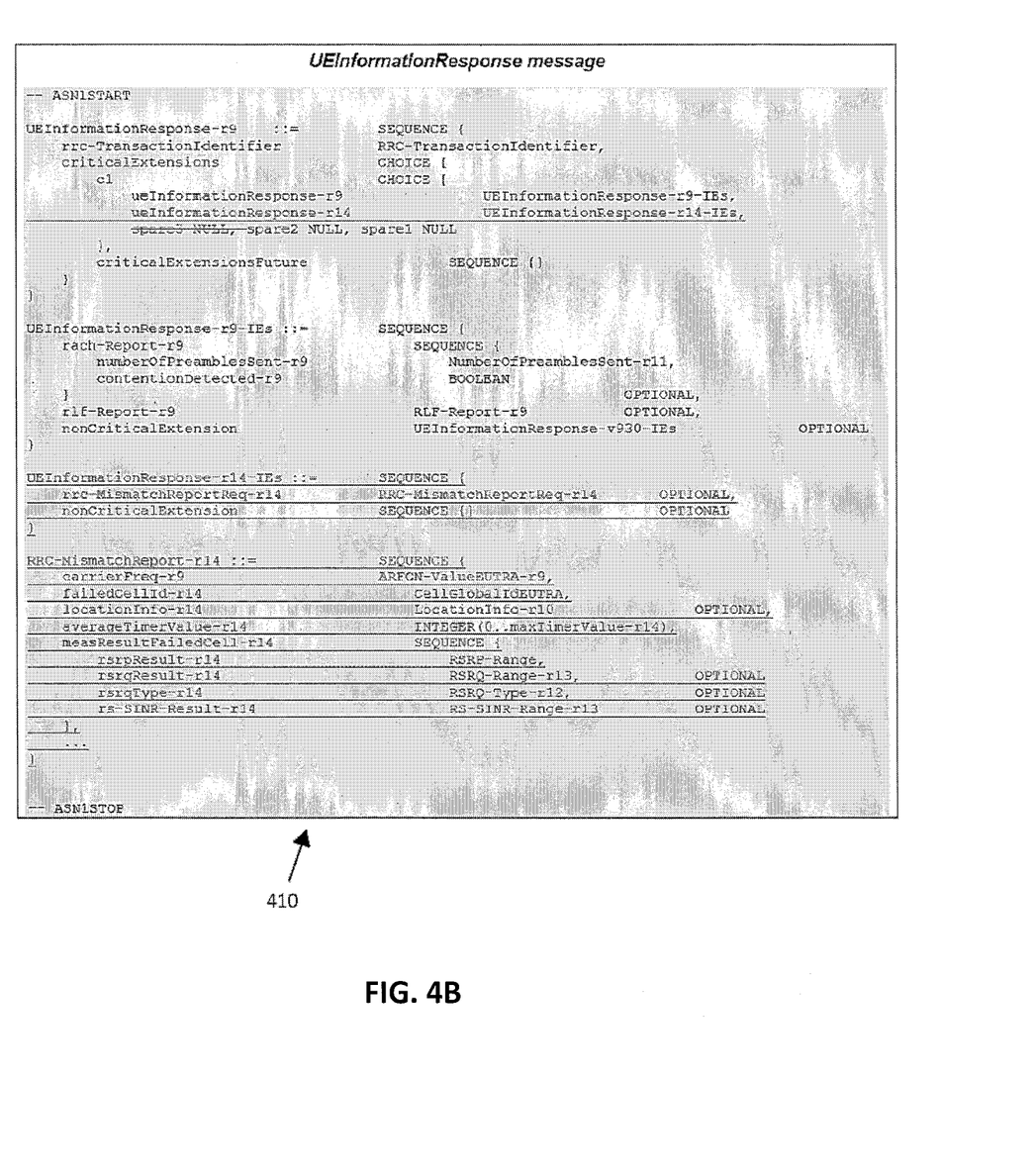

Referring now to FIGS. 4A and 4B. FIG. 4A represents an example structure of a UEInformationRequest message 400 and FIG. 4B represents an example structure of a UEInformationResponse message 410 in accordance with exemplary embodiments. Similar to UEInformationResponse message 300, each message 400, 410 is described using Abstract Syntax Notation 1 (ASN.1), and the information related to the reporting of RRC mismatches is shown with underline. UEInformationRequest message 400 may be transmitted by an eNB (e.g. eNB 170) to user equipment (e.g. UE 110). In this example, the UEInformationRequest message 400 includes a critical extension to indicate whether a UE is to report RRC mismatch occurrences. Referring also to FIG. 4B, this figure shows the structure of a UEInformationResponse message 410 which may be transmitted by a UE in response to reception of UEInformationRequest message 400. The UEInformationResponse message 410 may be used to report similar information as mentioned above for UEInformationResponse message 300. One advantage of UEInformationResponse 410 message is that it has a simpler structure of UEInformationResponse message 300.

In one embodiment, a UE may receive a configuration for a RRC release timer, and may log the specifics of the RRC release caused when the timer expires. In a related embodiment, data can be collected by the UE to calculate statistics of the timer value upon reset (including when the timer expires). This information can be provided to the wireless network from the UE. Additionally, the UE may indicate to the network about the existence of a report relating to the RRC mismatch occasions. For example, the report may be sent to the network in at least one of the following ways: in response to a request from the wireless network; the report may be 'piggybacked' on existing message (such as, e.g., described above with respect to FIG. 3); and the report may be sent within a dedicated message.

In one embodiment the UE may determine whether to log and/or report the RRC state mismatch or not. For instance, the determination may be based on one or more of the following: based on expiry of the inactivity timer causing UE to go to RRC_IDLE; based on some determined amount of inactivity time; or based on a configuration of the user equipment. For example, the inactivity timer may be a UE-based timer, e.g. a fixed timer pre-configured at the UE; or the inactivity timer may be a network configured timer, where the value of the timer is configurable by the network based on different conditions or scenarios.

In one embodiment, the UE may indicate to the network additional information about the RRC state mismatch including one or more of the following: failed cell; location information; measurements results of the failed cell; measurement results of all serving cells; and measurement results of the neighboring cells. In some embodiments, the UE may indicate to the network that at least one of: the inactivity timer expired; an RRC state mismatch was detected; and the number of RRC state mismatches detected.

In another embodiment, an eNB may configure a timer for causing a UE to release RRC configuration upon expiry. According to some embodiments, an eNB may receive an indication from a UE reporting RRC mismatch occurrences. In some embodiments, the eNB may request such a report from the UE, such as by using existing message or a dedicated message to request the report for example.

Figure 5:
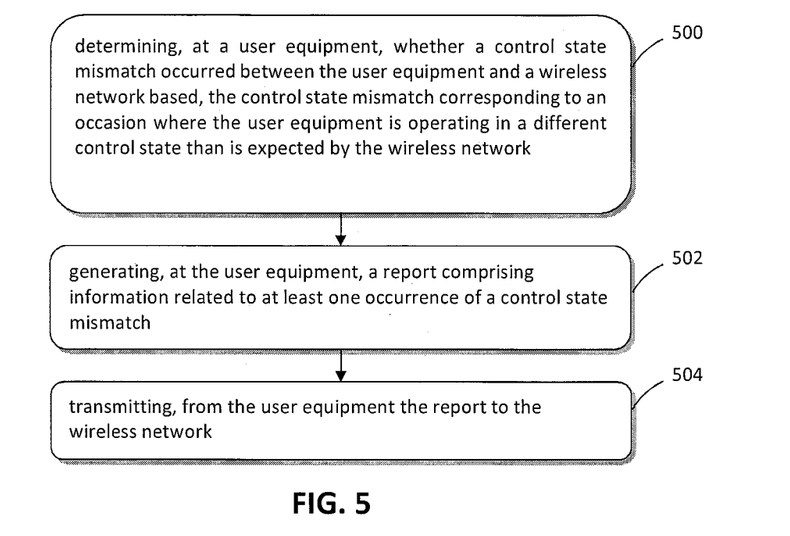
FIGS. 5 and 6 are logic flow diagrams for reporting of RRC mismatch occurrences, and illustrate the operation of exemplary methods, a result of execution of computer program instructions embodied on a computer readable memory, functions performed by logic implemented in hardware, and/or interconnected means for performing functions in accordance with exemplary embodiments.

FIG. 5 is a logic flow diagram for reporting of RRC mismatch occurrences. This figure further illustrates the operation of an exemplary method or methods, a result of execution of computer program instructions embodied on a computer readable memory, functions performed by logic implemented in hardware, and/or interconnected means for performing functions in accordance with exemplary embodiments. For instance, the determination module 140-1 and/or 140-2 may include multiples ones of the blocks in FIG. 5, where each included block is an interconnected means for performing the function in the block. The blocks in FIG. 5 are assumed to be performed by the UE 110, e.g., under control of the determination module 140-1 and/or 140-2 at least in part.

Referring to FIG. 5, a method may be provided comprising: determining, at a user equipment, whether a control state mismatch occurred between the user equipment and a wireless network, the control state mismatch corresponding to an occasion where the user equipment is operating in a different control state than is expected by the wireless network as indicated by block 500; generating, at the user equipment, a report comprising information related to at least one occurrence of a control state mismatch indicated by block 502; and transmitting, from the user equipment, the report to the wireless network as indicated by block 504.

Determining whether a control state mismatch occurred between the user equipment and a wireless network may be based on expiry of a timer.

The user equipment may generate the report based on an indication from the wireless network, and wherein the indication is received via at least one of: a broadcast signal and a dedicated signal.

The method may comprise: prior to transmitting the report, transmitting an indication about existence of the report to the wireless network.

Transmitting the report may comprise at least one of: transmitting the report in response to receiving a request from the network; transmitting the report in an existing message, wherein the existing message is modified to include the report; transmitting the report via a dedicated message for the report.

The user equipment may generate the report based on reception of a configuration for a timer from the wireless network.

The control state may be a radio resource control (RRC) state, and the timer may be an RRC release timer configured by the wireless network.

The method may further comprise, in response to each instance the timer is reset, updating data based on the value of timer when the timer was reset, wherein one of the instances the timer is reset comprises at least one of: resetting the timer in response to expiry of the timer; and resetting the timer before expiry of the timer.

The report may include at least one of: an indication that a timer expired; an indication that a control state mismatch occurred; and an indication of an amount of control state mismatches that occurred.

The report may include at least one of: identifying at least one cell in which the user equipment determined a control state mismatch occurred; frequency information of the cell serving user equipment when control state mismatch occurred; timer settings associated with the mismatch; location information of the user equipment when the control state mismatch occurred; measurements results of the at least one cell determined by the user equipment in response to determining the occurrence of a control state mismatch.

The measurement results of the at least one cell may include at least one of: measurement of a cell serving the user equipment; measurement of at least one neighbor cell.

According to another example, an apparatus is provided comprising: at least one processor; and at least one non-transitory memory including computer program code, the at least one memory and the computer program code configured to, with the at least one processor, cause the apparatus to perform at least the following: determining, at a user equipment, whether a control state mismatch occurred between the user equipment and a wireless network, the control state mismatch corresponding to an occasion where the user equipment is operating in a different control state than is expected by the wireless network; generating, at the user equipment, a report comprising information related to at least one occurrence of a control state mismatch; and transmitting, from the user equipment, the report to the wireless network.

The determination of whether a control state mismatch occurred between the user equipment and a wireless network may be based on expiry of a timer.

The user equipment may generate the report based on an indication from the wireless network, and wherein the indication is received via at least one of: a broadcast signal and a dedicated signal.

The at least one memory and the computer program code may be configured to, with the at least one processor, cause the apparatus to perform, prior to transmitting the report, transmitting an indication about existence of the report to the wireless network.

Transmission of the report may comprise at least one of: transmitting the report in response to receiving a request from the network; transmitting the report in an existing message, wherein the existing message is modified to include the report; transmitting the report via a dedicated message for the report.

The user equipment may generate the report based on reception of a configuration for a timer from the wireless network.

The control state may be a radio resource control (RRC) state, and the timer may be an RRC release timer configured by the wireless network.

The at least one memory and the computer program code are configured to, with the at least one processor, cause the apparatus to perform: in response to each instance the timer is reset, updating data based on the value of timer when the timer was reset, wherein one of the instances the timer is reset comprises at least one of: resetting the timer in response to expiry of the timer; and resetting the timer before expiry of the timer.

The report may include at least one of: an indication that a timer expired; an indication that a control state mismatch occurred; an indication of an amount of control state mismatches that occurred.

The report may include at least one of: an identity of at least one cell in which the user equipment determined a control state mismatch occurred; frequency information of the cell serving user equipment when control state mismatch occurred; timer settings associated with the mismatch; location information of the user equipment when the control state mismatch occurred; measurements results of the at least one cell determined by the user equipment in response to determining the occurrence of a control state mismatch.

The measurement results of the at least one cell may include at least one of: measurement of a cell serving the user equipment; and measurement of at least one neighbor cell.

According to another example embodiment, an apparatus may include means for determining, at a user equipment, whether a control state mismatch occurred between the user equipment and a wireless network, the control state mismatch corresponding to an occasion where the user equipment is operating in a different control state than is expected by the wireless network; means for generating a report comprising information related to at least one occurrence of a control state mismatch; and means for transmitting the report to the wireless network.

According to another example, a user equipment may comprise an apparatus according to example embodiments of the invention as disclosed herein.

Figure 6:
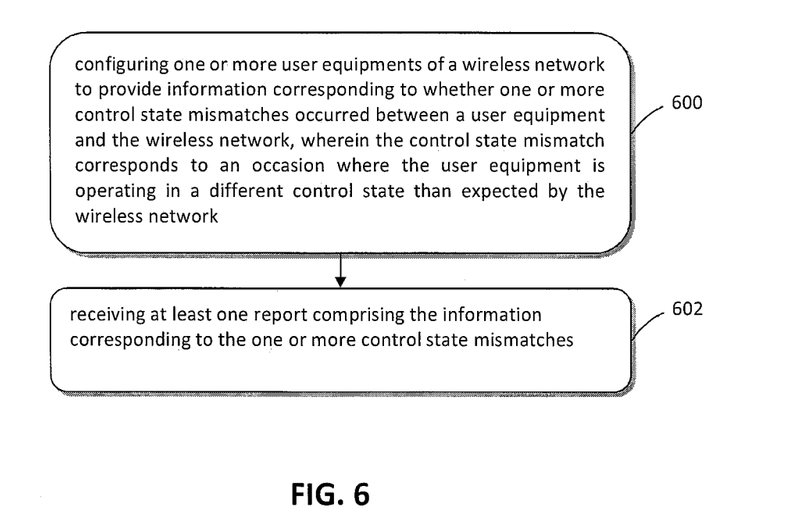

FIG. 6 is a logic flow diagram for reporting of RRC mismatch occurrences. This figure further illustrates the operation of an exemplary method or methods, a result of execution of computer program instructions embodied on a computer readable memory, functions performed by logic implemented in hardware, and/or interconnected means for performing functions in accordance with exemplary embodiments. For instance, the configuration module 150-1 and/or 150-2 may include multiples ones of the blocks in FIG. 6, where each included block is an interconnected means for performing the function in the block. The blocks in FIG. 6 are assumed to be performed by a base station such as eNB 170, e.g., under control of the configuration module 150-1 and/or 150-2 at least in part.

Referring to FIG. 6, a method may be provided comprising: configuring one or more user equipments of a wireless network to provide information corresponding to whether one or more control state mismatches occurred between a user equipment and the wireless network, wherein the control state mismatch corresponds to an occasion where the user equipment is operating in a different control state than expected by the wireless network as indicted by block 600; and receiving at least one report comprising the information corresponding to the one or more control state mismatches as indicated by block 602.

Configuring the user equipment may include: configuring a timer for causing the user equipment to determine occurrences of control state mismatches based upon expiry of the timer.

The control state is a radio resource control (RRC) state, and wherein the timer is an RRC release timer configured by the wireless network.

The method may further comprise: adjusting a value of the timer based on the at least one report.

The method may further comprise: prior to receiving the at least one report, receiving an indication of the existence of the at least report from a given user equipment; and transmitting a request to the given user equipment to send the report.

The request may be transmitted using at least one of: an existing message of wireless network, wherein the existing message is modified to include the request; and a dedicated message.

The report may include at least one of: an indication that a timer expired; an indication of a control state mismatch occurrence; and an indication of an amount of control state mismatches occurrences.

The report may include at least one of: an identity of at least one cell in which the user equipment determined a control state mismatch occurrence; location information of the user equipment when the control state mismatch occurred; and measurements results of the at least one cell determined by the user equipment in response to determining the occurrence of a control state mismatch.

The measurement results of the at least one cell may include at least one neighbor cell measurement.

According to another example, an apparatus may comprise: at least one processor; and at least one memory including computer program code, the at least one memory and the computer program code configured to, with the at least one processor, cause the apparatus to perform at least the following: configuring one or more user equipments of a wireless network to provide information corresponding to whether one or more control state mismatches occurred between a user equipment and the wireless network, wherein the control state mismatch corresponds to an occasion where the user equipment is operating in a different control state than expected by the wireless network; and receiving at least one report comprising the information corresponding to the one or more control state mismatches.

Configuration of the user equipment may include: configuration of a timer for causing the user equipment to determine occurrences of control state mismatches based upon expiry of the timer.

The control state is a radio resource control (RRC) state, and wherein the timer is an RRC release timer configured by the wireless network.

The at least one memory and the computer program code may be configured to, with the at least one processor, cause the apparatus to further perform: adjusting a value of the timer based on the at least one report.

The at least one memory and the computer program code may be configured to, with the at least one processor, cause the apparatus to further perform: prior to receiving the at least one report, receiving an indication of the existence of the at least report from a given user equipment; and transmitting a request to the given user equipment to send the report.

The request may be transmitted using at least one of: an existing message of wireless network, wherein the existing message is modified to include the request; and a dedicated message.

The report may include at least one of: an indication that a timer expired; an indication of a control state mismatch occurrence; and an indication of an amount of control state mismatches occurrences.

The report may include at least one of: an identity of at least one cell in which the user equipment determined a control state mismatch occurrence; location information of the user equipment when the control state mismatch occurred; and measurements results of the at least one cell determined by the user equipment in response to determining the occurrence of a control state mismatch.

The measurement results of the at least one cell may include at least one neighbor cell measurement.

According to another example embodiment, an apparatus may include: means for configuring one or more user equipments of a wireless network to provide information corresponding to whether one or more control state mismatches occurred between a user equipment and the wireless network, wherein the control state mismatch corresponds to an occasion where the user equipment is operating in a different control state than expected by the wireless network; and means for receiving at least one report comprising the information corresponding to the one or more control state mismatches.

According to another example, a base station may comprise the apparatus according to example embodiments of the invention as disclosed herein.

According to another example, a communication system may comprise an apparatus in accordance with any one of example embodiments of the invention as disclosed herein.

A computer program comprising program code for executing the method according to example embodiments of the invention as disclosed herein. The computer program may be a computer program product comprising a computer-readable medium bearing computer program code embodied therein for use with a computer.

Without in any way limiting the scope, interpretation, or application of the claims appearing below, a technical effect of one or more of the example embodiments disclosed herein is detecting the occurrence of RRC mismatches which allows the network to more reliably determine the appropriate actions to correct them. Another technical effect of one or more of the example embodiments disclosed herein is providing a data input for appropriate network planning and optimizations or alignments to avoid side-effects and failures in the network. Another technical effect of one or more of the example embodiments disclosed herein is the collected data can provide statistics or network performance visualization on issues with mismatches that should be corrected by tailored network settings.

Embodiments herein may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium (e.g., memories 125, 155, 171 or other device) that may be any media or means that can contain, store, and/or transport the instructions for use by or in connection with an instruction execution system, apparatus, or device, such as a computer. A computer-readable storage medium does not comprise propagating signals.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The following abbreviations that may be found in the specification and/or the drawing figures are defined as follows:

eNB (or eNodeB) evolved Node B (e.g., an LTE base station)
3GPP $3^{rd}$ Generation Partnership Project
ASN.1 Abstract Syntax Notation One
E-UTRAN Evolved Universal Terrestrial Radio Access Network
I/F interface
LTE long term evolution
MDT Minimization of Drive Tests
MME mobility management entity
NCE network control element
N/W network RACH Random Access Channel
Rel-X Release X
RLF Radio Link Failure
RRC Radio Resource Control
RRH remote radio head
RSRP reference signal received power
RSRQ reference signal received quality
RS-SINR reference signal—signal to interface ratio
Rx receiver
SGW serving gateway
Tx transmitter
UE user equipment (e.g., a wireless, typically mobile device)

What is claimed is:

1. A method comprising:
   receiving, at a user equipment, information comprising a configuration of a mismatch timer;
   determining, at the user equipment, based at least on the configuration of the mismatch timer that a control state mismatch occurred between the user equipment and a wireless network, the control state mismatch corresponding to an occasion where the user equipment is operating in a different control state than is expected by the wireless network;
   based on the determining, generating, at the user equipment, a report of logged data of additional information related to at least one occurrence of a control state mismatch; and
   transmitting, from the user equipment, the report of the logged data of the additional information to the wireless network,
   wherein the additional information comprises a time value of said mismatch timer, and
   wherein the time value comprises at least one of:
      a time that a radio resource control mismatch was detected,
      a time value from when the user equipment transitioned to a radio resource control IDLE state, or
      a time value equal to the configured mismatch timer.

2. The method of claim 1, wherein the user equipment generates the report based on an indication from the wireless network, and wherein the indication is received via at least one of: a broadcast signal and or a dedicated signal.

3. The method of claim 1, comprising:
   prior to transmitting the report, transmitting an indication about existence of the report to the wireless network, wherein transmitting the report comprises at least one of:
      transmitting the report in response to receiving a request from the network,
      transmitting the report in an existing message, wherein the existing message is modified to include the report, or
      transmitting the report via a dedicated message for the report.

4. The method of claim 1, wherein the user equipment generates the report based on reception of the configuration of the mismatch timer from the wireless network.

5. The method of claim 1, wherein the control state is a radio resource control state, and wherein the mismatch timer is a radio resource control release timer configured by the wireless network.

6. The method of claim 1, comprising:
   in response to each instance the mismatch timer is reset, updating data based on a value of the mismatch timer when the timer was reset,
   wherein a reset of the instance of the mismatch timer comprises at least one of:
      resetting the timer in response to expiry of the mismatch timer, or
      resetting the mismatch timer before expiry of the mismatch timer.

7. The method of claim 1, wherein the additional information related to the at least one occurrence of the control state mismatch corresponds to radio conditions of the user equipment when the at least one control state mismatch occurred.

8. The method of claim 1, wherein generating the report comprises logging the at least one occurrence of the control state mismatch within one of: a Minimization of Drive Test logging framework and a Radio Link Failure logging framework.

9. The method of claim 1, wherein generating the report comprises logging the at least one occurrence of the control state mismatch within a log specific for reporting only radio resource control mismatch occurrences.

10. The method of claim 1, wherein the report comprises at least one of:
    an indication that the mismatch timer has expired;
    an indication that a control state mismatch occurred, or
    an indication of an amount of control state mismatches that occurred.

11. The method of claim 1, wherein the report comprises at least one of:
    identification of at least one cell in which the user equipment determined a control state mismatch occurred,
    location information of the user equipment when the control state mismatch occurred, or
    measurements results of the at least one cell determined by the user equipment in response to determining the occurrence of a control state mismatch.

12. The method according to claim 11, wherein the measurement results of the at least one cell comprise at least one neighbor cell measurement.

13. An apparatus, comprising:
    at least one processor; and
    at least one non-transitory memory including computer program code,
    the at least one memory and the computer program code configured to, with the at least one processor, cause the apparatus to perform at least:
    receive, at a user equipment, information comprising a configuration of a mismatch timer;
    determine, at the user equipment, based on at least the configuration of the mismatch timer, that a control state mismatch occurred between the user equipment and a wireless network, the control state mismatch corresponding to an occasion where the user equipment is operating in a different control state than is expected by the wireless network;
    generate, at the user equipment based on the determining, a report of logged data of additional information related to at least one occurrence of a control state mismatch; and
    transmitting, from the user equipment, the report of the logged data of the additional information to the wireless network,
    wherein the additional information comprises a time value of said mismatch timer, and
    wherein the time value comprises at least one of:
       a time that a radio resource control mismatch was detected, a time value from when the user equipment transitioned to a radio resource control IDLE state, or a time value equal to the configured mismatch timer.

14. The apparatus of claim 13, wherein the user equipment generates the report based on an indication from the wireless network, and wherein the indication is received via at least one of:

a broadcast signal, or a dedicated signal.

15. The apparatus of claim 13, wherein the at least one memory and the computer program code are configured to, with the at least one processor, cause the apparatus to perform, prior to transmitting the report, transmitting an indication about existence of the report to the wireless network; and wherein transmitting the report comprises at least one of:

transmitting the report in response to receiving a request from the network, transmitting the report in an existing message, wherein the existing message is modified to include the report, or transmitting the report via a dedicated message for the report.

16. The apparatus of claim 13, wherein the user equipment generates the report based on reception of a configuration for the mismatch timer from the wireless network.

17. The apparatus of claim 13, wherein the control state is a radio resource control state, and wherein the mismatch timer is an radio resource control release timer configured by the wireless network.

18. The apparatus of claim 13, wherein the at least one memory and the computer program code are configured to, with the at least one processor, cause the apparatus to perform:

in response to each instance the mismatch timer is reset, updating data based on the value of the mismatch timer when the mismatch timer was reset, wherein resetting each instance of the mismatch timer comprises at least one of:

resetting the mismatch timer in response to expiry of the mismatch timer, or resetting the mismatch timer before expiry of the mismatch timer.

19. The apparatus of claim 13, wherein the report comprises at least one of:

an indication that the mismatch timer expired;

an indication that a control state mismatch occurred, or an indication of an amount of control state mismatches that occurred.

20. The apparatus of claim 13, wherein the report comprises at least one of:

an identity of at least one cell in which the user equipment determined a control state mismatch occurred, location information of the user equipment when the control state mismatch occurred, or measurements results of the at least one cell determined by the user equipment in response to determining the occurrence of a control state mismatch.

21. A non-transitory computer readable memory comprising computer program code embodied thereon, which when executed by an apparatus causes the apparatus to perform at least the following:

receiving, at a user equipment, information comprising a configuration of a mismatch timer;

determining based on at least the configuration of the mismatch timer, at the user equipment, that a control state mismatch occurred between the user equipment and a wireless network, the control state mismatch corresponding to an occasion where the user equipment is operating in a different control state than is expected by the wireless network;

based on the determining, generating, at the user equipment, a report of logged data of additional information related to at least one occurrence of a control state mismatch; and transmitting, from the user equipment, the report to the wireless network, wherein the additional information comprises a time value of said mismatch timer, and wherein the time value comprises at least one of:

a time that the radio resource control mismatch was detected, a time value from when the user equipment transitioned to a radio resource control IDLE state, or a time value equal to the configured mismatch timer.

* * * * *

UNITED STATES PATENT AND TRADEMARK OFFICE
CERTIFICATE OF CORRECTION

PATENT NO. : 10,524,153 B2
APPLICATION NO. : 15/880881
DATED : December 31, 2019
INVENTOR(S) : Koskinen et al.

Page 1 of 1

It is certified that error appears in the above-identified patent and that said Letters Patent is hereby corrected as shown below:

In the Claims

Claim 2, Column 15, Line 44 "and" should be deleted in between --signal-- and --or--.

Signed and Sealed this
Eighteenth Day of February, 2020

Andrei Iancu
*Director of the United States Patent and Trademark Office*